United States Patent [19]

Maulshagen et al.

[11] Patent Number: 4,580,697
[45] Date of Patent: Apr. 8, 1986

[54] CUP DROP RING FOR DRINK MACHINE

[75] Inventors: Thomas J. Maulshagen, Elizabeth; Andris C. Sloss, Sussex, both of N.J.

[73] Assignee: Rowe International, Inc., Whippany, N.J.

[21] Appl. No.: 560,968

[22] Filed: Dec. 13, 1983

[51] Int. Cl.4 .................. B65H 3/28; B65H 31/20; G07F 11/16
[52] U.S. Cl. .................................. 221/223; 221/241; 221/242; 221/297
[58] Field of Search .............. 221/222, 223, 241, 242, 221/297

[56] References Cited

U.S. PATENT DOCUMENTS 1,950,382  3/1934  Benson ............................. 221/297
2,037,751  4/1936  Barbieri ............................ 221/223
3,000,408  9/1961  Vischer ......................... 221/222 X
3,071,292  1/1963  Atwood et al. ................... 221/223
3,426,941  2/1969  Hovekamp ........................ 221/222
4,426,017  1/1984  Ficken et al. .................... 221/222

Primary Examiner—Richard E. Gluck
Attorney, Agent, or Firm—Shenier & O'Connor

[57] ABSTRACT

An improved cup drop ring including a plurality of cams having pivot axes disposed on the locus of a circle for concomitant rotation to release a cup, respective pinions on said cams and respective racks engaging said pinions pivotally supported on a drive ring with a mechanism for concomitantly moving said pivot axes radially to accommodate a different size cup while maintaining said racks in engagement with said pinions.

7 Claims, 6 Drawing Figures

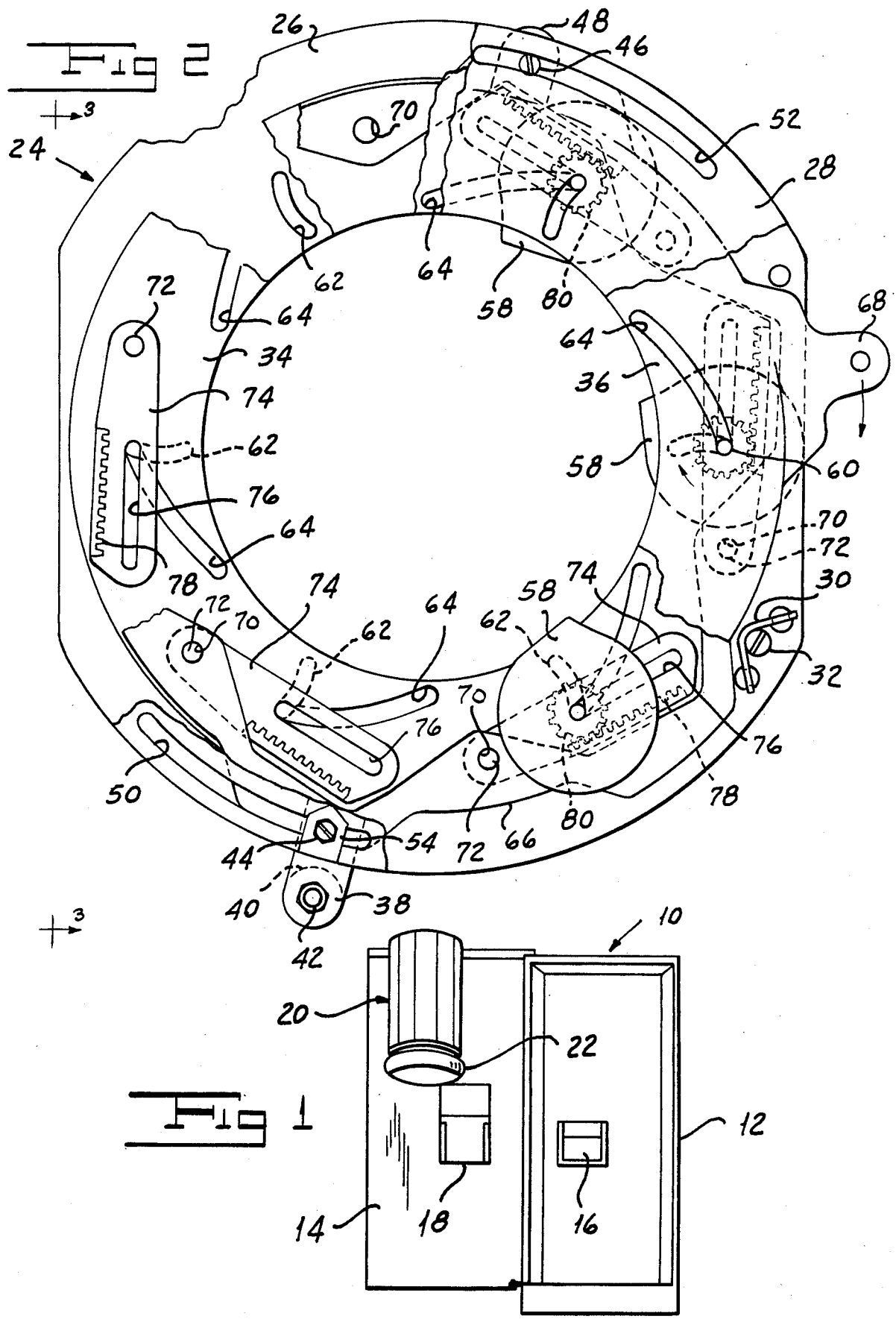

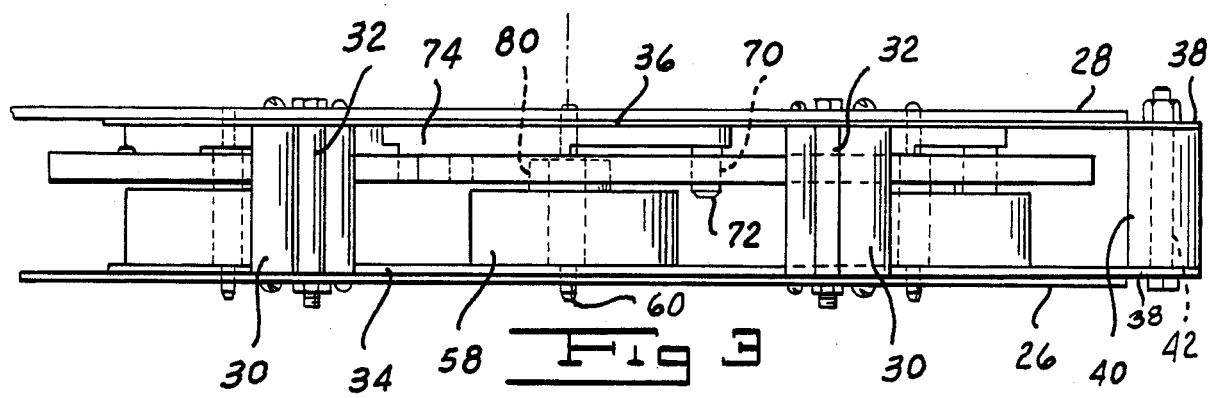
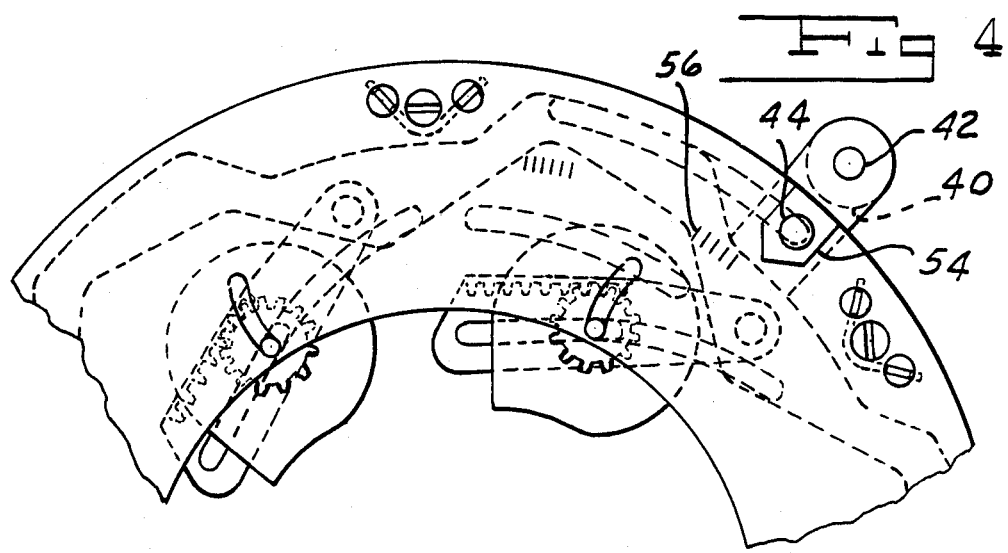
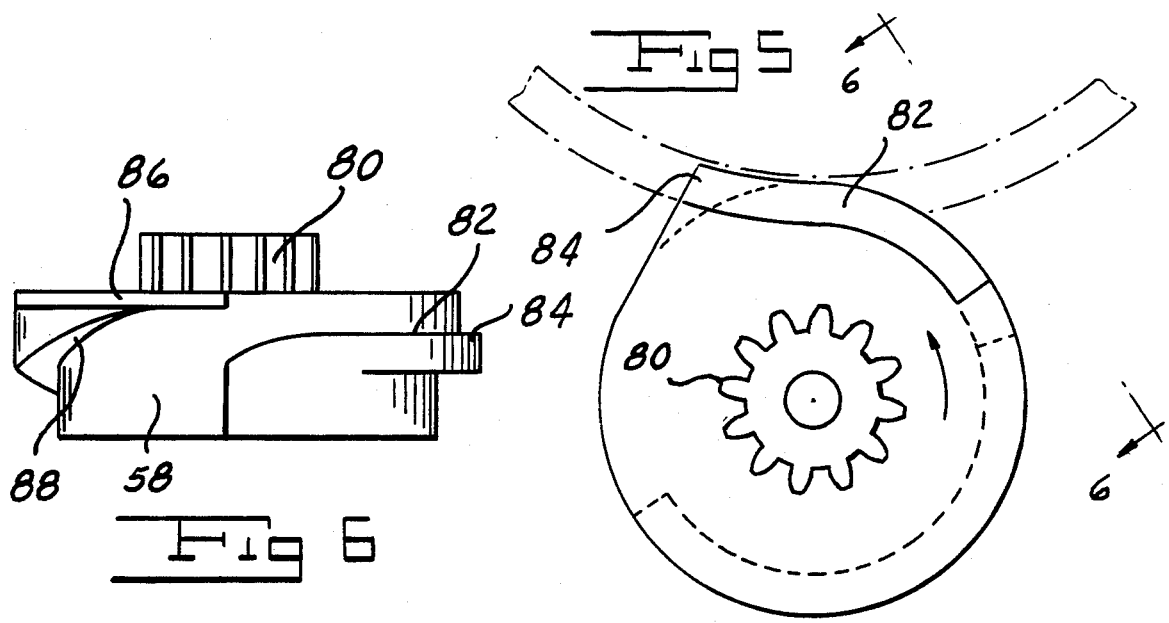

CUP DROP RING FOR DRINK MACHINE

FIELD OF THE INVENTION

The invention relates to the field of merchandising machines and more particularly to an improved cup drop ring for a drink merchandising machine.

BACKGROUND OF THE INVENTION

There are known in the prior art merchandising machines which are adapted to deliver drinks in response to the deposit of money in the machine. In operation thereof, when a sum in coins aggregating the purchase price of a drink has been inserted in the machine and the appropriate selecting mechanism actuated, a cup supply mechanism delivers a cup to a location at which it is accessible to a customer and the machine delivers the drink to the cup. One form of such a cup delivery mechanism known as a cup drop ring includes a plurality of cams arranged in a circle with surfaces thereof adapted to support a column of cups by engagement with the peripheral bead of the lowermost cup. When a cup is to be dispensed the cams are rotated in unison to remove the support from under the lowermost cup while at the same time supporting those cups above the lowermost to permit the lowermost cup to drop to the delivery location.

One of the most common mechanisms for rotating the cams of the cup drop ring is a common ring gear which engages respective pinions on the cam shafts. While this arrangement effectively rotates the cams to deliver cups one at a time, it makes no provision for changing cup size. It is desirable that a cup drop mechanism be adjustable to accommodate cups of different size.

Atwood et al Pat. No. 3,071,292, discloses a cup drop mechanism which is adjustable to accommodate cups of different sizes. More specifically, the cam shafts are slidable along slots inwardly and outwardly for different cup sizes. While the Atwood et al mechanism is adjustable for cup size, it incorporates a number of disadvantages. The actuating linkage is complicated. There is excessive difference in angular velocity of the cams for cups of different sizes. The amount of angular displacement of the cams is relatively small for cups of certain size, being only about 45°. Other arrangements for changing cup size are shown in Carew Pat. No. 2,946,481 and Kinney Pat. No. 3,311,260. The arrangements shown in these patents, however, require changing of parts of the cup drop mechanism in order to accommodate cups of different sizes.

SUMMARY OF THE INVENTION

One object of our invention is to provide an improved cup drop ring for a drink machine which overcomes the defects of cup drop rings of the prior art.

Another object of our invention is to provide an improved cup drop ring which is adjustable for cup size while retaining all of the advantages of a cup drop ring incorporating a common drive ring gear.

Yet another object of our invention is to provide an improved cup drop ring in which neither the speed of operation nor the angular displacement of the cams changes appreciably in response to a cup size adjustment.

Still another object of our invention is to provide an improved cup drop ring which provides approximately 180° of cam rotation for all cup sizes.

A further object of our invention is to provide an improved cup drop ring for a drink machine which provides rapid actuation.

Yet another object of our invention is to provide an improved cup drop mechanism for a drink machine which affords infinite adjustment of cup size.

A still further object of our invention is to provide an improved cup drop mechanism for a drink machine which is more secure than are cup drop mechanisms of the prior art.

Other and further objects of our invention will appear from the following description.

BRIEF DESCRIPTION OF THE DRAWINGS

FIG. 1 is an elevation of a drink machine which may be provided with our improved cup drop mechanism.

FIG. 2 is a bottom plan of our improved cup drop mechanism with some parts broken away and with other parts removed.

FIG. 3 is a side elevation of the form of our improved cup drop mechanism illustrated in FIG. 2 taken along the line 3—3 thereof.

FIG. 4 is a fragmentary bottom plan of our improved cup drop mechanism illustrating the position of the parts in accommodating a smaller size cup than that in the position of the parts shown in FIG. 2.

FIG. 5 is a top plan of one of the cams of our improved cup drop ring for drink machine.

FIG. 6 is an elevation of the cam illustrated in FIG. 5 taken along the line 6—6 thereof.

DESCRIPTION OF THE PREFERRED EMBODIMENT

Referring now to the drawing, a drink merchandising machine indicated generally by the reference character 10 with which our cup drop mechanism may be used includes a cabinet 12 provided with a door 14 mounted on the cabinet for movement between a closed position over the front of the cabinet and the open position illustrated in FIG. 1. Cabinet 12 includes a cup delivery housing 16 having an open front and into which a cup is adapted to be delivered. Cabinet 12 also houses the necessary mechanism (not shown) for delivering beverage ingredients or a mixed beverage as well as ice to a cup positioned in the housing 16. Since this mechanism per se forms no part of our invention, it will not be described in detail. When the door 14 is closed over the cabinet 12, the housing 16 is accessible to a customer through an opening 18 which may be closed by a suitable door if desired. With the door 14 closed, a cup turret 20 is positioned relative to a cup dispensing mechanism 22 to permit individual cups from one of the columns of the turret to be delivered to the housing 16.

The cup delivery mechanism 22 includes our improved cup drop ring indicated generally by reference character 24. The assembly 24 includes a generally circular upper housing plate 26 and a generally circular lower housing plate 28 held in spaced relationship by means of spacers 30 having bolts 32 associated therewith. It will be appreciated that as many spacers 30 as are necessary may be employed. While only one of the spacers has been illustrated in detail in FIG. 2, six such spacers and associated bolts are incorporated in a complete mechanism.

The assembly 24 includes an upper cup size adjusting plate 34 and a lower cup size adjusting plate 36. We form the upper and lower plates with respective first radially extending lugs 38 at corresponding locations around the ring assembly 24. A spacer 40 positioned between the outer ends of the lugs 38 is held in position by any suitable means, such as by a bolt 42. A first pin 44 extending between the lugs 38 is adapted to ride in a pair of registering slots 50 formed in the upper and lower housing plates 26 and 28. A second pin 46 extending between a pair of radial lugs 48 located approximately diametrically opposite to the lugs 38 on the upper and lower plates 34 and 36 rides in slots 52 formed in the respective upper and lower housing plates 26 and 28. It will be appreciated that by virtue of the arrangement just described, the adjusting plates 34 and 36 may be moved between two positions at which the pin 44 is adjacent the respective ends of slots 50 and pin 46 is correspondingly adjacent to the opposite ends of the pairs of slots 52. As will more fully be explained hereinbelow, these two positions represent the extremes of cup size which can be accommodated by the mechanism. If desired, we may assemble a pointer 54 on the pin 44 for cooperation with indicia 56 on the outside of the lower housing plate to indicate the size of the cup for which the mechanism has been set.

Our improved cup drop ring 24 includes a plurality of cup drop cams 58 to be described in more detail hereinbelow having respective shafts 60, each of which extends through a pair of aligned housing plate slots 62 and through aligned adjusting plate slots 64.

The drive ring 66 of the assembly 24 is formed of a lug 68 adapted to be coupled to the armature of a solenoid (not shown) or the like to permit the ring to be driven to actuate the cams 58 in a manner to be described more fully hereinbelow. We form the ring 66 with a plurality of circumferentially spaced holes 70 adapted to receive rack pins 72 carried by racks 74. Each of the racks 74 is formed with a longitudinally extending slot 76 through which the shaft 60 of the associated cam 58 extends. Each rack 74 further is formed with rack teeth 78 which engage the teeth of a pinion 80 which is unitary with the cam 58 with which that rack 74 is associated.

Referring now to FIGS. 5 and 6, each of the cams 58 has a surface portion 82 adapted to receive the underside of the lip of the lowermost cup of a column so that the cams acting together support the column of cups. We form our cam with an extension 84 of the surface 82 to provide a more secure arrangement by increasing the resistance to the manual withdrawal of the lowermost cup by a person reaching in through the delivery opening of the machine.

In the course of a cup drop operation, each of the cams 58 rotates in a counterclockwise direction as viewed in FIG. 5 to cause a knife edge 86 to move in between the upper edge of the peripheral lip of the lowermost cup and the underside of the lip of the next cup in the column. As this takes place, the lip of the lowermost cup moves downwardly into the track 88 so that the cup is forced down out of the ring toward the housing 16.

FIG. 2 shows the relative positions of the parts when the mechanism is set to dispense the largest size cup. In order to set the mechanism to deliver smaller cups, screws associated with the pins 44 and 46 are loosened to free the adjusting plates 34 and 36. When this has been done, spacer 40 is actuated to move the plates 34 and 36 in a clockwise direction as viewed in FIG. 2 to move the pins 44 and 46 toward the other ends of the pairs of slots 50 and 52. In the course of this operation, slots 64 act on the shafts 60 to move them inwardly along the slots 62. In the course of this operation, the racks 74 pivot slightly in a counterclockwise direction, as viewed in FIG. 2. When this occurs, pinions 80 roll along the rack teeth 78 so that the cams 58 are always properly positioned to receive the underside of the lip of the lowermost cup of a stack. When the desired adjustment has been made, the screws associated with pins 44 and 46 are tightened and the cup drop ring is again ready for operation. By way of example, we have illustrated in FIG. 4 the relative positions of the parts for delivery of the smallest cup to be dispensed.

It will be seen that we have accomplished the objects of our invention. We have invented a cup drop ring which overcomes the disadvantages of cup drop rings of the prior art. Our cup drop mechanism is adjustable to accommodate cups of different size while retaining all the advantages of a cup drop ring having a common ring. Our ring permits adjustment of cup size without appreciably changing either the angular speed or the angular displacement of the cup drop cams. Our ring ensures a relatively large angular displacement of the cams for all cup sizes. It is more secure than are cup drop rings of the prior art.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. An improved cup drop mechanism for individually releasing cups having external peripheral beads around the mouths thereof from a stack of said cups including in combination, a plurality of cup drop cams each having a cup bead supporting surface and a pivot axis, means mounting said cams with the pivot axes thereof in spaced relationship on the locus of a circle and for individual movement around said pivot axes between first positions at which said bead supporting surfaces receive the bead of the lowermost cup of a stack and second positions at which said surfaces are clear to free said lowermost cup, respective pinions on said cams, individual racks associated with said pinions, a drive ring mounted for movement around the axis of said circle and means pivotally supporting said racks on said drive ring, for concomitantly pivoting said cams from said first positions to said second positions to release said lowermost cup.

2. An improved cup drop mechanism as in claim 1 including means for shifting said cam pivot axes radially inwardly with reference to said circle to accommodate a smaller size cup.

3. An improved cup drop mechanism as in claim 2 in which each of said cams has a shaft, said pivot axis shifting means comprising a first plate having a plurality of generally radial slots through which said shafts extend, a second plate having a plurality of circumferentially and radially extending cam slots through which said shafts pass, and means for moving said second plate relative to said first plate to cause said cam slots to move said shafts along said radial slots.

4. An improved cup drop mechanism as in claim 1 in which each cam has a shaft, each of said racks having a longitudinal slot, each of said shafts extending through said slots to maintain the engagement of said racks with said pinions.

5. An improved cup drop mechanism as in claim 1 in which each of said cams is generally cylindrical, a generally circular peripheral cup bead receiving ledge on each cam and a generally tangential extension on each ledge, said extensions being in the direction of rotation of the associated cam.

6. In an improved cup drop mechanism, apparatus including a plurality of cams having pivot axes disposed in spaced relationship on the locus of a circle for concomitant rotation of said cams around said axes to release a cup, a common drive ring, respective pinions on said cams, a plurality of racks associated with said pinions, means pivotally supporting said racks on said ring in engagement with said pinions and means for concomitantly moving said pivot axes radially to accommodate a different size cup while maintaining said racks in engagement with said pinions.

7. Apparatus as in claim 6 in which said pinions have shafts and said racks are formed with slots, and in which said engagement maintaining means comprises extensions of said shafts disposed in said slots.

* * * * *